(12) United States Patent
Lagar

(10) Patent No.: US 7,793,958 B2
(45) Date of Patent: Sep. 14, 2010

(54) ADJUSTABLE-CASTER ANGLE DEVICE FOR A MOTORCYCLE

(75) Inventor: Jean-Paul Lagar, Saint-Juery (FR)

(73) Assignee: Lagar Concept Company, Saint Juery (FR)

( * ) Notice: Subject to any disclaimer, the term of this patent is extended or adjusted under 35 U.S.C. 154(b) by 459 days.

(21) Appl. No.: 11/794,826

(22) PCT Filed: Jan. 5, 2006

(86) PCT No.: PCT/FR2006/000015

§ 371 (c)(1),
(2), (4) Date: Jul. 6, 2007

(87) PCT Pub. No.: WO2006/072740

PCT Pub. Date: Jul. 13, 2006

(65) Prior Publication Data

US 2008/0018076 A1 Jan. 24, 2008

(30) Foreign Application Priority Data

Jan. 7, 2005 (FR) .................................. 05 00133

(51) Int. Cl.
*B62D 17/00* (2006.01)
(52) U.S. Cl. .................................. 280/279; 280/281.1
(58) Field of Classification Search ................ 280/279, 280/281.1, 785, 276; 180/219
See application file for complete search history.

(56) References Cited

U.S. PATENT DOCUMENTS

| 3,866,946 | A | * | 2/1975 | Robison | 280/279 |
| 4,600,207 | A | * | 7/1986 | Zosi | 280/279 |
| 5,938,225 | A | * | 8/1999 | Scheibe et al. | 280/279 |
| 6,783,158 | B2 | * | 8/2004 | Nakagawa et al. | 280/785 |
| 2006/0113745 | A1 | * | 6/2006 | Lagar | 280/279 |

FOREIGN PATENT DOCUMENTS

| FR | 2842491 | | 1/2004 |
| JP | 8-127380 | * | 5/1996 |

* cited by examiner

*Primary Examiner*—Anne Marie M Boehler
(74) *Attorney, Agent, or Firm*—Young & Thompson

(57) ABSTRACT

Device includes plates which are connected by an axle that extends through a guiding piece and a ball joint element positioned at the ends of a column tube. Rotating elements are disposed in the plates and enable same to rotate around the axle which is blocked in rotation by the guiding piece. The guiding piece has a concave spherical surface coupled to the convex surface of the eccentric which is equipped with a bore that is off-centre in relation to the vertical axis of the spherical surfaces and a flat surface which is perpendicular to the axis of the bore. An eccentric pivots in the bore and on the surface via a cylinder and a surface. The eccentric is equipped with a bore that is off-centre in relation to the cylinder. The combined reverse rotation of the eccentrics enables the assembly to pivot around the axis.

9 Claims, 4 Drawing Sheets

Fig.5
Fig.4
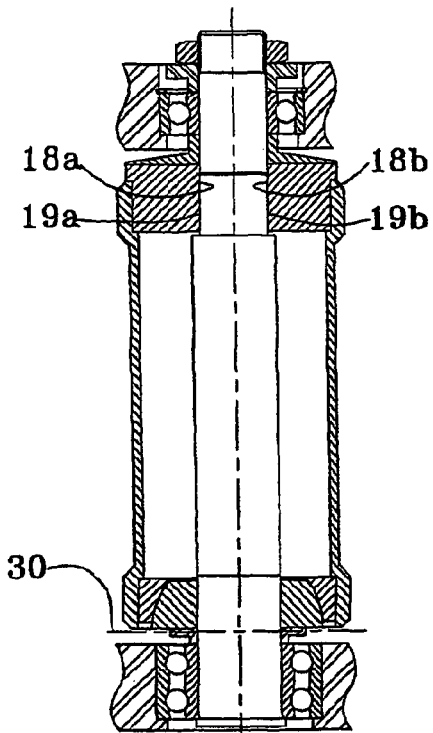
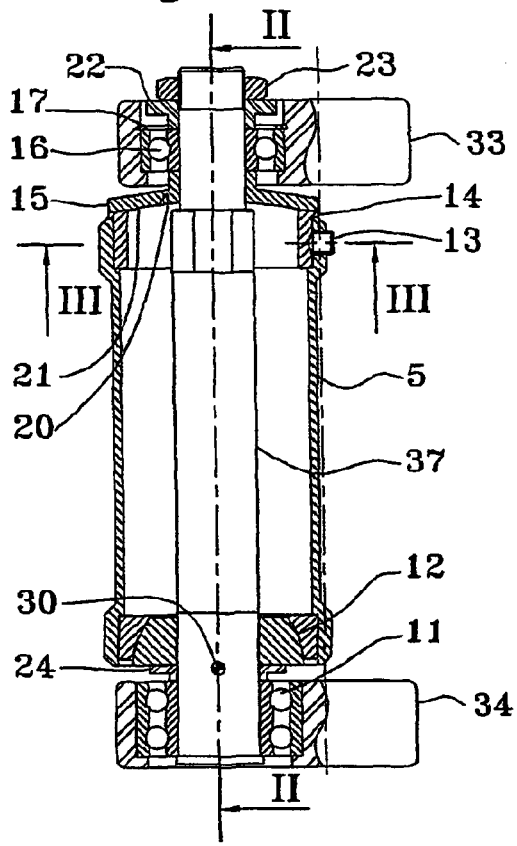
Fig.6
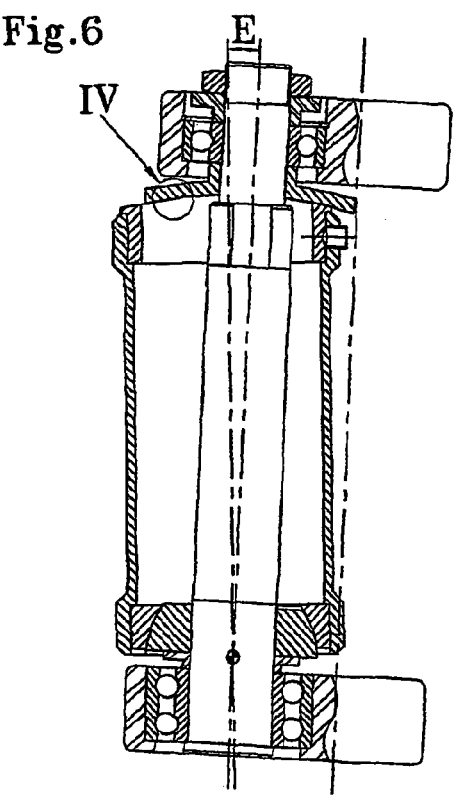
Fig.7
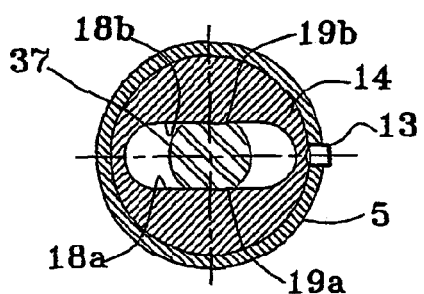
Fig.8
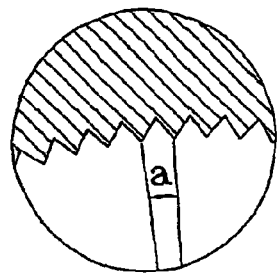

US 7,793,958 B2

ADJUSTABLE-CASTER ANGLE DEVICE FOR A MOTORCYCLE

FIELD OF THE INVENTION

This invention relates to an improvement to a device for attaching the front wheel assembly to the chassis of a motorcycle, allowing a modification of parameters that define the dynamic qualities of the vehicle and in particular the caster angle and the value of the ground caster, as is written in French Patent No. 02 09176, filed on Jul. 19, 2002 in the name of the same patent holder.

BACKGROUND OF THE INVENTION

In this French Patent No. 02 09176, with reference to FIG. 1, FIG. 2 and FIG. 3, the current method that is most commonly used by the motorcycle manufacturers to produce the attachment of the front wheel assembly is disclosed. FIG. 1 shows a sketch of the front wheel assembly of a motorcycle made in the median plane of the latter. FIG. 2 shows the same sketch but seen from the front. FIG. 3 shows the detailed assembly of the steering column via a section 1-1 of FIG. 2 passing through its axis of rotation. Thus, the front wheel (1) is, in the vast majority of designs, held by the front suspension element that consists of two parallel and telescopic struts (2a) and (2b), ensuring the functions of guiding, suspension and absorbing shocks, and located on both sides of the wheel, on its axis of rotation and perpendicular to the latter. These two elements are connected in their upper portion by two plates. An upper plate (3) is located at their upper end, and a lower plate (4) is located below the upper plate and at a distance that allows total freedom of movement of the wheel in its oscillations. These two plates encircle the steering column of the chassis.

The steering column is the front portion of the chassis. It consists of a head (5) into which guiding means (6a) and (6b), which allow the pivoting of a shaft (7) that passes through them along the shaft of the head (5), are located at each end. This shaft (7) is called a "steering column shaft." It is attached to the middle of the lower plate (4), passes through the steering column of the chassis by passing into the guiding means (6a) and (6b), then passes through the upper plate (3).

A pivoting function is thus created between the chassis and the front wheel assembly. With the handlebars (8) that are attached to the upper plate (3), the pilot can change direction by making the front wheel assembly—and therefore the front wheel—pivot.

FIG. 3 shows a commonly used design, by way of nonlimiting example, of an assembly of the steering column. Here, the guide means (6a) and (6b) are shown by roller bearings with conical rollers, mounted clamped in the housings of the column (5), facing one another and in an O shape. The nut (9) makes it possible to regulate the play necessary to the rotation of the roller bearings. The checknut (10) locks the overall device by preserving this operational play.

So as to give stability to the vehicle, the pivoting shaft is tilted toward the front so that the axis of rotation of the front wheel is found in front of the steering column. The angle (A) that is formed by the perpendicular line to the ground and the pivoting axis is called a "caster angle." The distance (C) between the projection of the pivoting axis on the ground and the point where the wheel makes contact with the ground is called "ground castor."

In the French Patent No. 02 09176, the importance of the value of the caster angle and the desire of the users, in particular in competition, to be able to quickly modify the value of this angle, is also explained.

The invention according to the French Patent No. 02 09176 proposes an upper and lower plate assembly and a column shaft that can be mounted easily on the column (5) of the motorcycle chassis that are used in series by the manufacturers, which offers the special feature of being able to vary the caster angle (A) by a value that is more or less on the order of 1° to 3° and the offset (B), independently, on the upper and lower plates, whereby these adjustment modifications can be carried out quickly without detaching the front wheel assembly.

Thus, in referring to FIG. 4, FIG. 5, FIG. 6, FIG. 7 and FIG. 8, an embodiment of the invention is disclosed according to the French Patent No. 02 09176. FIG. 4 is a section 1-1 of FIG. 2 for mounting the steering column allowing the adjustment of the caster angle (A) in the center position. FIG. 5 is a section H-II of FIG. 4. FIG. 6 is a section that is identical to FIG. 4 but in an end adjustment position. FIG. 7 is a section along IfI-III of FIG. 4. FIG. 8 is the enlarged aspect IV of surfaces (20) and (21). In this assembly, the steering head (5) of the chassis is preserved, but the guiding elements (6a) and (6b) of FIG. 3, ensuring the pivoting of the front wheel assembly relative to the chassis, are replaced respectively by the elements (16) and (11) that are located respectively in the upper plate (33) and the lower plate (34). In this way, the rotation of the front wheel assembly is preserved despite the locking in rotation of the column shaft (37).

The shaft (37) passes through the guide element (11) that is shown here by way of nonlimiting example by a roller bearing with a double row of balls and attached in a suitable manner in the plate (34) like, for example, in a non-limiting way, a shrunk-on fitting and machined support, so as to support the axial forces directed upward and transmitted by the front wheel assembly through the plate (34), and passes through a ball joint with oblique contact (12) located at the site of the guide element (6b) of FIG. 3 in the head (5) in a suitable way and able to support the axial forces transmitted by the element (11).

A crosspiece (24) can be located between the elements (11) and (12) so as to ensure minimum space between the top of the plate (34) and the bottom of the head (5) to allow the rocking movement of the plate (34). This crosspiece (24) can also be provided with any sealing means to protect the elements (11) and (12).

In its upper portion, the shaft (37) passes through a guide part (14) that is attached at the site of the element (6a) of FIG. 3 in the head (5) in a suitable manner and by way of nonlimiting example by a shrunk-on fitting and a float-needle screw (13) inhibiting any movement of rotation of the part (14) in the head (5). The part (14) has a groove with parallel sides (18a) and (18b). It is imperative that the axis of this groove be located in the plane of FIG. 4, or more exactly in the plane of FIG. 1, which is the median plane of the vehicle and the plane of definition of the caster angle (A).

Two flat surfaces with parallel sides (19a) and (19b) with dimensions that allow their sliding without play on the sides respectively (18a) and (18b) of the groove of the part (14) are produced on the shaft (37).

The upper surface (20) of the part (14) is a portion of the cylinder of the shaft (30) that is perpendicular to the sides (18a) and (18b) of the groove and that pass through the center of rotation of the ball joint (12). The part (15) that is located above the part (14) has a cylindrical lower surface (21) that is coupled to the surface (20) such that the part (15) can slide over the part (14) by pivoting around the axis (30) of cylindrical surfaces. The part (15) is pierced in its center and perpendicularly to the shaft (30) of the cylindrical surface to allow passage from the top of the column shaft (37).

The shaft (37) then passes through the guide element (16), shown here by way of nonlimiting example by a rigid roller bearing with balls, suitably attached in the upper plate (33) and in particular by a shrunk-on fitting and holding circlips (17), and passes through the crosspiece (22) on which a locking nut (23) rests.

When the nut (23) is not tight, it is possible to make the front wheel assembly pivot around the shaft (30), guided by the sliding of the sides (19a) and (19b) of the shaft (37) on the sides (18a) and (18b) of the groove of the part (14) and the sliding of the cylindrical surface (21) from the part (15) to the conjugated surface (20) of the part (14). Once positioned at the value (E) of the FIG. 6 corresponding to the desired value of the modification of the caster angle (A), the nut (23) is tightened in a suitable manner to lock this position by adhesion of surfaces (20) and (21).

To ensure an effective locking and to avoid any risk of sliding of the surface (21) over the surface (20), subjected to significant forces transmitted by the front wheel assembly in the braking phase or strong compression of the suspension, it is advantageous to provide locking by a stop and not by adhesion alone by making small grooves on the surfaces so that the surface (21) engages perfectly with the surface (20) as shown in FIG. 8. These grooves are made on lines parallel to the shaft (30) of the cylindrical surfaces (20) and (21). They are shown here by way of nonlimiting example of a triangular section and allow an angular adjustment by pitch (a). So as to provide modifications that are sensitive to the behavior of the vehicle, it is recommended to produce a pitch (a) on the order of 0.2°. A pitch of a more significant value limits the number of usable catches because it causes modifications of the behavior of the front wheel assembly that are too pronounced from one catch to the next. The use in competition of the invention according to the French Patent No. 02 09176 shows that the adjustments of more than the order of 1° are never used. A pitch on the order of 0.2° makes it possible to obtain on the order of 5 adjustment catches that are more or less usable relative to the original position, which shows a good adjustment range.

To comply with the catches on the order of 0.2°, it is necessary to produce a very small cog that becomes difficult to handle and that is primarily vulnerable if it is not positioned properly before the nut (23) is tightened. In addition, these cogs make the parts (14) and (15) very expensive to produce.

SUMMARY OF THE INVENTION

This invention shows an improvement that makes it possible to produce an overall device that is very simple to handle, with a correct and effective range of adjustment and a more economical production.

BRIEF DESCRIPTION OF THE DRAWINGS

FIG. 4 is an embodiment of the invention according to the French Patent N° 0209176, in a section I-I of FIG. 2 for mounting the steering head allowing the adjustment of the caster angle (A), in the center position.

FIG. 5 is a section II-II of FIG. 4.

FIG. 6 is a section that is identical to FIG. 4 but in an end adjustment position.

FIG. 7 is a section along III-III of FIG. 4.

FIG. 8 is the enlarged aspect IV of surfaces (20) and (21).

DETAILED DESCRIPTION OF THE INVENTION

Figure 1:
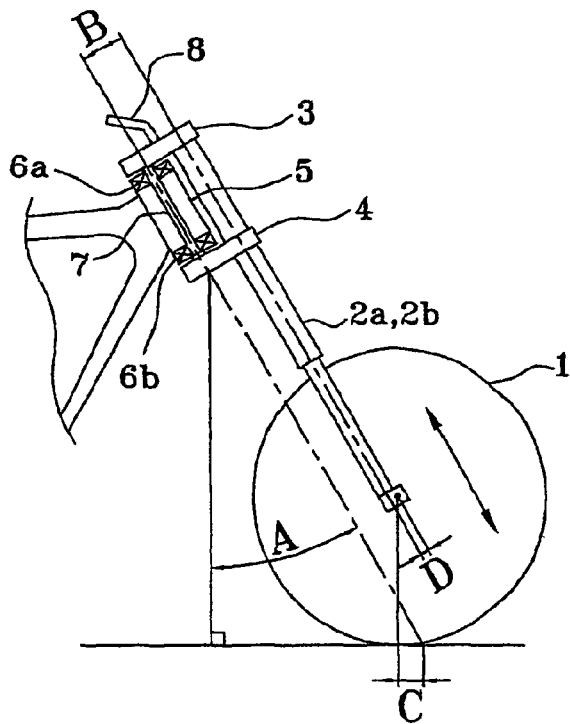
FIG. 1 shows a sketch of the front wheel assembly of a motorcycle made in the median plane of the latter.
Figure 2:
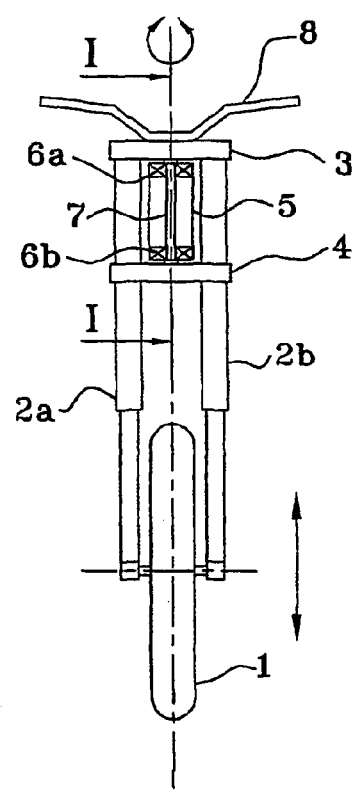
FIG. 2 shows the same sketch but seen from the front.
Figure 3:
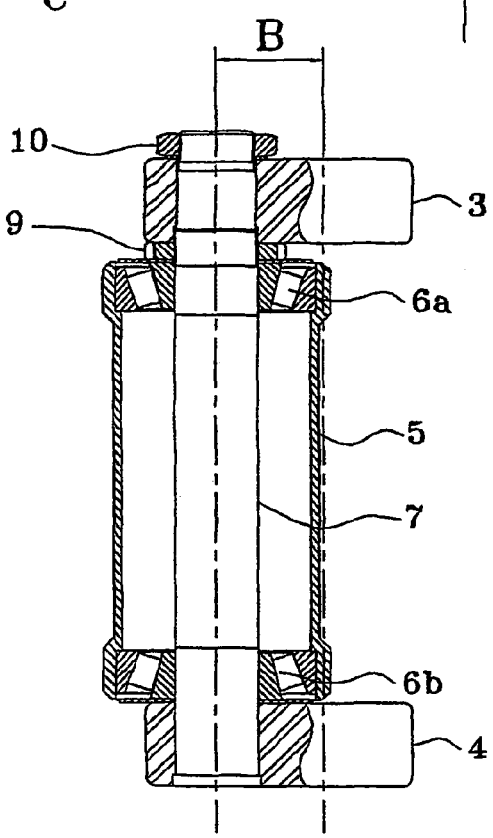
FIG. 3 shows the detailed assembly of the steering head via a section I-I of FIG. 2 passing through its axis of rotation.
Figure 10:
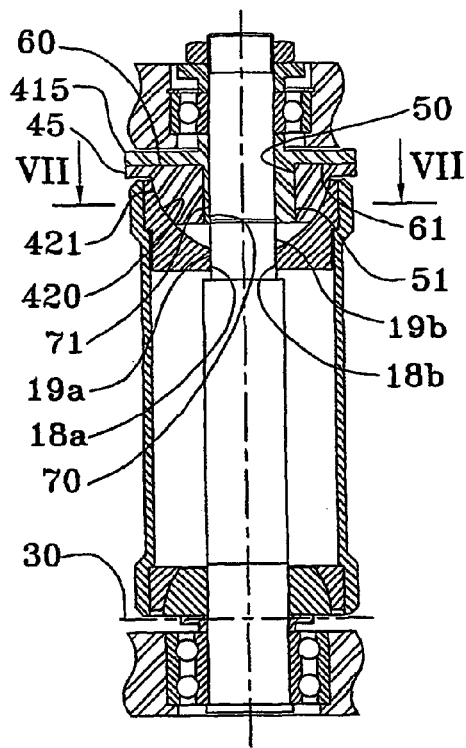
FIG. 10 is a section V-V of FIG. 9.
Figure 9:
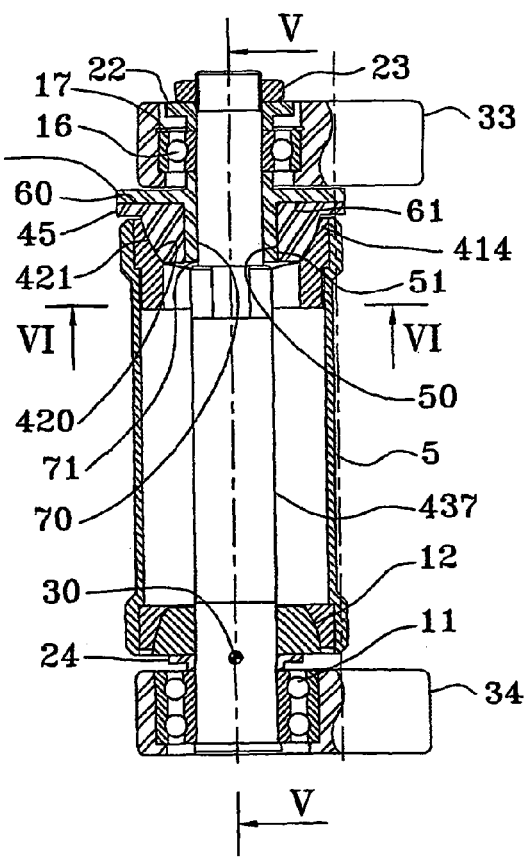
FIG. 9 is a section I-I of FIG. 2 of the assembly of the steering head that makes it possible to adjust the caster angle (A), in the center position.

More specifically, and by referring to the accompanying drawings, provided by way of nonlimiting examples, where the different preferred embodiments of the invention are shown, in addition to FIG. 1, FIG. 2, FIG. 3, FIG. 4, FIG. 5, FIG. 6, FIG. 7 and FIG. 8, referred to previously:

FIG. 9 is a section 1-1 of FIG. 2 of the assembly of the steering column that makes it possible to adjust the caster angle (A), in the center position. FIG. 10 is a section V-V of FIG. 9.

Figure 12:
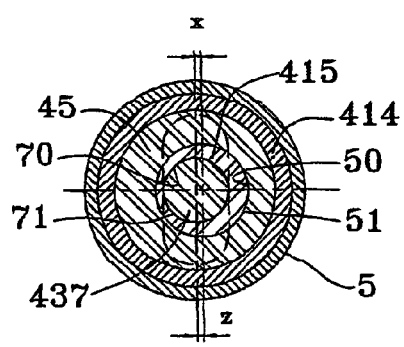
FIG. 12 is a section along VII-VII of FIG. 10.
Figure 11:
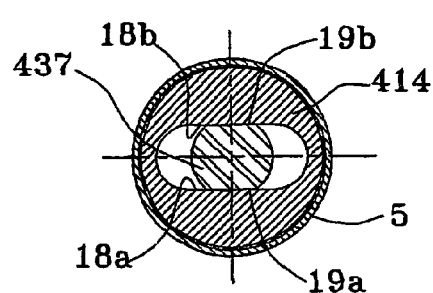
FIG. 11 is a section along VI-VI of FIG. 9.
Figure 14:
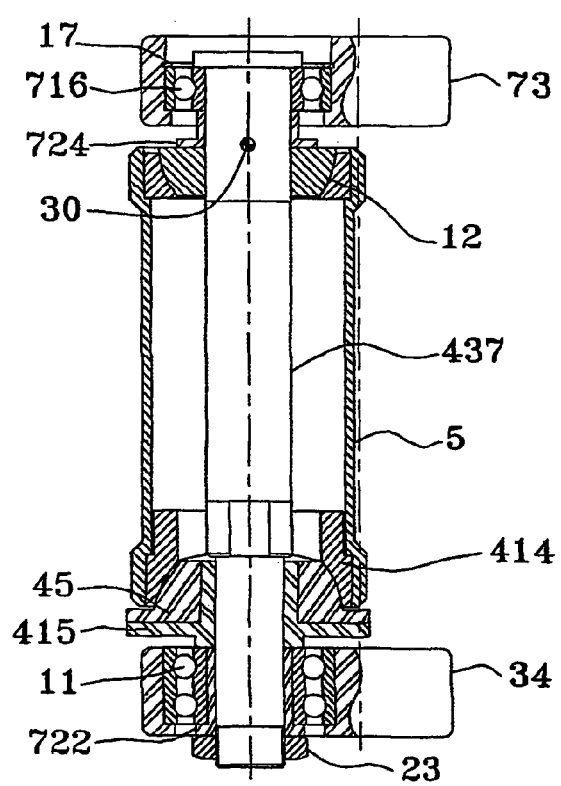
FIG. 14 is a section I-I of FIG. 2 of the assembly of the steering head that makes it possible to adjust the caster angle (A), in the center position and mounted in a manner opposite to the assembly of FIG. 10.
Figure 13:
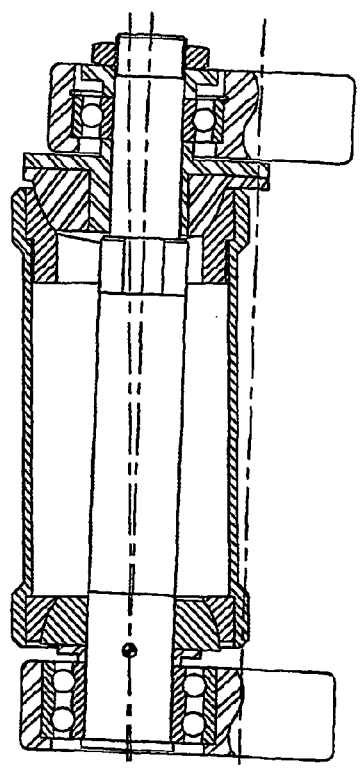
FIG. 13 is a section that is identical to FIG. 9, but in an end position for adjustment.

FIG. 11 is a section along VI-VI of FIG. 9. FIG. 12 is a section along VII-VII of FIG. 10. FIG. 13 is a section that is identical to FIG. 9, but in an end position for adjustment. FIG. 14 is a section along VIII-VIII of FIG. 13.

FIG. 15 is a section 1-1 of FIG. 2 of the assembly of the steering column that makes it possible to adjust the caster angle (A), in the center position and mounted in a manner opposite to the assembly of FIG. 10.

FIG. 9, FIG. 10, FIG. 11, FIG. 12, FIG. 13 and FIG. 14 show, by way of nonlimiting example, a design of a device according to the invention. In this assembly, the guiding part (414) has a centrally concave spherical surface (420) that is positioned above the surface (420) and on the shaft of the steering head (5). This guide part still has a groove with parallel sides (18a) and (18b) with a shaft that is contained in the median plane of the vehicle. This part is attached in a suitable manner and, for example, nonlimiting manner, by a shrunk-on fitting in the steering head (5) that prevents it from any rotation around the shaft of this head. The shaft (437) still has two flat surfaces with parallel sides (19a) and (19b) with dimensions that allow their sliding without play on the sides, respectively (18a) and (18b), of the groove of the part (414). An eccentric (45) is located above the part (414).

This eccentric is in contact with the part (414) by a convex spherical surface (421) of the same radius as that of the surface (420) so that the eccentric (45) can act as a ball joint around the center of the spherical surfaces. This eccentric (45) has a bore (50) with an eccentric vertical axis of a value (x) relative to the vertical axis of the spherical surfaces (420) and (421). The top of the part (45) is a planar surface (60) that is perpendicular to the shaft of the bore (50).

A second eccentric (415) has a cylindrical portion (51) of a size that allows rotation without play in the bore (50) of the eccentric (45). This part also has a planar surface (61) that is perpendicular to the shaft of the cylinder (51) and that rests on the planar surface (60) of the eccentric (45). The part (415) has a bore (70) with an eccentric shaft relative to the shaft of the cylinder (51) of a value (z). By nonlimiting example, identical values for (x) and (z) on the order of 1 to 2 mm, as is shown in FIG. 9, FIG. 10, FIG. 12, FIG. 13, FIG. 14 and FIG. 15, will preferably be assumed. The bore (70) is sized so as to allow rotation without play of the eccentric (415) around the cylindrical surface (71) of the shaft (437).

To obtain the center position of FIG. 9 and FIG. 10, it is necessary to make the off-centering of the eccentric (45) opposite that of the eccentric (415), as this is shown in FIG. 10 and FIG. 12, because here the values of (x) and (z) are identical. For different values, the off-centerings will not be perfectly opposed.

Starting from this center position, any rotation of angle (g) of the eccentric (45), carried out in one direction at the same time as a rotation of angle (g') (if the off-centerings (x) and (z) have identical values, then (g)=(g')) of the eccentric (415) that is carried out in the opposite direction, makes it possible to tilt the shaft (437) and, for example, to reduce the caster angle. By making the reverse angles at (g) and (g'), the shaft (437) is tilted in the other direction and therefore, for example, the caster angle is increased. This inclination is made possible by the combined rotations of the two eccentrics (45) and (415) and by the sliding of spherical surfaces (420) and (421). With values of (x) and (z) on the order of 1 to 2 mm, rotations of angles (g) and (g$^1$) on the order of 10° to 20° make it possible to create an inclination of the shaft (437) on the order of 0.2° on a steering column that is equipped with a head (5) with a length on the order of 200 mm.

Once positioned at the desired value (E), the tightening of the nut (23) makes it possible to maintain the position. Despite the significant forces encountered on a steering column of a competition motorcycle, a moderate value of tightening of the nut (23) is necessary because of the adhesion of different parts in contact and small lever arms provided by slight off-centerings (x) and (z).

However, and so as to ensure the positioning of the adjustment even when the nut (23) is not correctly tightened, a pin (80) passing through the two parts, and in particular the two planar surfaces (60) and (61) as shown in FIG. 13, is provided to be able to link the two eccentrics (45) and (415) via a connection part such as, for example, in a non-limiting manner. Thus, a number of housings made on any of the two parts (45) and (415) to accommodate the connection part make it possible to make an adjustment that is not defined by the difference between these housings, as shown in FIG. 14.

It should be noted that the device that is mounted in a manner opposite to that of FIG. 9 also makes possible the adjustment of the caster angle (A). The adjustment nut (23) can also and independently be positioned below the plate (34).

FIG. 15 shows such an assembly where the ball-joint element (12) is mounted instead of the upper guide element (6a), and the guide part (414) instead of the lower guide element (6b). The eccentrics (45) and (415) are then found below the part (414). Here, the column shaft (437) is mounted in the opposite direction of FIG. 9, and the torque nut (23) is positioned below the plate (34). The nut (23) is resting on the crosspiece (722) that is adapted to the dimensions of the roller bearing (11) and the shaft (437). The plate (73), the roller bearing (716) and the crosspiece (724) are suitable for the reverse assembly.

The invention claimed is:

1. Device for attaching the front wheel assembly to the chassis of a motorcycle, the chassis of the motorcycle include a steering head (5) with upper and lower housings (6a, 6b), said device comprising:
   an upper plate (33, 73);
   a lower plate (34);
   a column shaft (437) connecting the lower plate (34) and the upper plate (33, 73) by the column shaft passing through the steering head (5), the column shaft (437) having a cylindrical surface (71);
   a guide part (414) and a ball-joint (12) located in upper and lower housings of the guide elements of the steering head (5), the guide part (414) and the ball-joint (12) being traversed by the column shaft (437);
   a groove located within one said guide part (414), the groove having parallel sides (18a, 18b) with an axis contained in the median plane of the motorcycle;
   two flat surfaces with parallel sides (19a, 19b) along the column shaft (437) sliding without play on the parallel sides (18a, 18b) of the groove;
   rotating elements (11, 16, 716) placed respectively in the lower plate (34) and in the upper plate (33, 73), the rotating elements allowing rotation of the upper and lower plates on the column shaft (437) with the column shaft (437) immobilized therein in rotation relative to the steering head (5) by the guide part (414);
   a shaft (30) perpendicular to the parallel sides of the groove (18a, 18b) and passing via a center of rotation of the ball joint (12), the front wheel assembly pivotable around the shaft (30);
   a nut (23) positioned at one end of the column shaft (437), the nut (23) operative to lock a position of the shaft (437) at a desired angular value;
   a centrally concave spherical surface (420) on the guide part (414) positioned above a corresponding surface (420) on the shaft of the steering head (5);
   a first eccentric (45) with a convex spherical surface (421), the first eccentric (45) in contact with the guide part (414) by the convex spherical surface (421) of the first eccentric being in contact with and having same radius as the convex spherical surface (420) of the guide part (414);
   a bore (50) within the first eccentric (45), the bore (50) having an eccentric vertical shaft
   a planar surface (60) on a top on the first eccentric (45), the planar surface (60) perpendicular to the shaft of the bore (50);
   a second eccentric (415) having a cylindrical portion (51) of a size that allows a rotation without play in the bore (50) of the first eccentric (45), the second eccentric (415) having a planar surface (61) perpendicular to a shaft of the cylinder portion (51) and resting on the planar surface (60) of the first eccentric (45), the second eccentric (415) having a bore (70) with an eccentric shaft relative to the shaft of the cylinder portion (51), and the second eccentric having a bore (70) allowing rotation of the second eccentric without play around the cylindrical surface (71) of the column shaft (437).

2. Device according to claim 1, wherein any rotation of the first eccentric (45) that is carried out in a first direction at the same time as a rotation of the second eccentric (415) that is carried out in an opposite second direction allows tilting of the column shaft (437) to provide for respectively reducing and increasing caster angle based a direction of the tilting of the column shaft (437).

3. Device according to claim 1, wherein the first and second eccentrics (45, 415) have identical off-centering values.

4. Device according to claim 1, wherein the first and second eccentrics are linked by one connection part (80).

5. Device according to claim 4, wherein the first and second eccentrics (45, 415) comprises housings accommodating the connection part (80).

6. Device according to claim 1, wherein the first and second eccentrics are linked by a pin (80) passing through the first and second eccentrics.

7. Device according to claim 1, wherein the first and second eccentrics are linked by a pin (80) passing through the respective planar surfaces (60, 61) of the first and second eccentrics.

8. Device according to claim 6, wherein the first and second eccentrics (45, 415) comprises housings accommodating the connection part (80).

9. Device according to claim 7, wherein the first and second eccentrics (45, 415) comprises housings accommodating the connection part (80).

* * * * *